US012789578B2

(12) United States Patent
Tan

(10) Patent No.: US 12,789,578 B2
(45) Date of Patent: Nov. 10, 2026

(54) THERMAL MANAGEMENT SYSTEM FOR VEHICLE, AND WORKING METHOD THEREOF

(71) Applicant: Schaeffler Technologies AG & Co. KG, Herzogenaurach (DE)

(72) Inventor: Hao Tan, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 159 days.

(21) Appl. No.: 18/572,394

(22) PCT Filed: Jun. 30, 2021

(86) PCT No.: PCT/CN2021/103456
§ 371 (c)(1),
(2) Date: Dec. 20, 2023

(87) PCT Pub. No.: WO2023/272566
PCT Pub. Date: Jan. 5, 2023

(65) Prior Publication Data
US 2024/0286454 A1 Aug. 29, 2024

(51) Int. Cl.
*B60H 1/00* (2006.01)

(52) U.S. Cl.
CPC ..... *B60H 1/00392* (2013.01); *B60H 1/00278* (2013.01); *B60H 1/00485* (2013.01)

(58) Field of Classification Search
CPC ............ B60H 1/00392; B60H 1/00278; B60H 1/00485; B60L 7/02; B60L 58/26;
(Continued)

(56) References Cited

U.S. PATENT DOCUMENTS

2017/0355373 A1* 12/2017 Dalum ................ F16H 61/0031
2020/0047591 A1* 2/2020 He ..................... B60H 1/32284
(Continued)

FOREIGN PATENT DOCUMENTS

CN 104144810 A 11/2014
CN 107444131 A 12/2017
(Continued)

OTHER PUBLICATIONS

First Office action Corresponding to Chinese Patent Application No. 202180097759.4, dated Dec. 27, 2024, 11 Pages.
(Continued)

*Primary Examiner* — Kamran Tavakoldavani

(57) ABSTRACT

A thermal management system for a vehicle is provided that includes a main path, a first branch and a second branch. A braking system and a first power source, which are connected in series to each other, are provided in the main path. A battery is provided in the first branch, and electric motor assemblies are provided in the second branch. The main path can be selectively in communication with at least one of the first branch and the second branch, such that a fluid medium from the main path can be driven by the first power source to flow through at least one of the first branch and the second branch and then return to the main path. Therefore, heat generated by a braking system of a vehicle can be fully utilized, and the waste of energy during the braking process of the vehicle is reduced.

18 Claims, 5 Drawing Sheets

(58) Field of Classification Search
CPC ............. B60L 2240/36; H01M 10/625; H01M 10/6562; H01M 10/6567; H01M 10/663
USPC ............................................................ 165/202
See application file for complete search history.

(56) References Cited

U.S. PATENT DOCUMENTS

| | | | | |
|---|---|---|---|---|
| 2020/0189357 | A1 * | 6/2020 | Chopard | ............ B60H 1/00499 |
| 2020/0339136 | A1 | 10/2020 | Inagaki et al. | |

FOREIGN PATENT DOCUMENTS

| | | | | |
|---|---|---|---|---|
| CN | 107565189 | A | * | 1/2018 |
| CN | 109693549 | A | | 4/2019 |
| CN | 109986960 | A | | 7/2019 |
| CN | 110281736 | A | | 9/2019 |
| CN | 110758056 | A | | 2/2020 |
| CN | 110949182 | A | | 4/2020 |
| CN | 112549952 | A | | 3/2021 |
| CN | 112590733 | A | | 4/2021 |
| WO | 2020173351 | A1 | | 9/2020 |

OTHER PUBLICATIONS

Second Office action Corresponding to Chinese Patent Application No. 202180097759.4, dated May 10, 2025, 10 Pages.
Decision of Rejection Corresponding to Chinese Patent Application No. 202180097759.4, dated Aug. 11, 2025, 5 Pages.

* cited by examiner

THERMAL MANAGEMENT SYSTEM FOR VEHICLE, AND WORKING METHOD THEREOF

CROSS-REFERENCE TO RELATED APPLICATIONS

This application is the U.S. National Phase of PCT Application No. PCT/CN2021/103456 filed on Jun. 30, 2021, the entire disclosure of which is incorporated by reference herein.

TECHNICAL FIELD

The present disclosure relates to the field of thermal management of vehicles and a working method thereof.

BACKGROUND

In an existing electric vehicle, a braking energy recovery system has been widely applied. Therefore, during the braking process of the vehicle, the vast majority of kinetic energy is recovered into a battery of the electric vehicle, and the remaining kinetic energy is converted into thermal energy to be dissipated into air. However, there are the following situations during the braking energy recovery process mentioned above.

i. The kinetic energy of the electric vehicle is converted into the thermal energy to be dissipated into the air, which causes that this part of kinetic energy to be wasted actually.

ii. In a low temperature environment, the charging efficiency of the battery is relatively low, which generates an adverse influence on the braking energy recovery. Moreover, there is a certain risk when battery charging is carried out in the low temperature environment, this is because the lithium deposition of the battery will cause a short circuit of the battery and thus lead to thermal runaway of the battery. Further, in a case that the state of charge of the battery is high, more kinetic energy cannot be converted into electric energy, the wasted kinetic energy will increase, and thermal degradation of a braking system is caused.

iii. As the energy of the battery increases, the weight of the electric vehicle increases. The electrification of heavy vehicles such as trucks and buses will cause an increase in kinetic energy during the running of the electric vehicle, such that the kinetic energy that cannot be recovered when the electric vehicle is braked increases, which will also cause thermal degradation of the braking system. Further, similar situations may also occur when the electric vehicle carries out emergency braking.

It can be seen from this that the braking energy recovery of the existing electric vehicle will cause a lot of kinetic energy being wasted in many cases, and easily cause the phenomenon of thermal degradation of the braking system of the vehicle.

SUMMARY

The present disclosure is provided to overcome or at least alleviate the deficiencies in the prior art mentioned above. One object of the present disclosure is to provide a novel thermal management system for a vehicle, which can transfer the heat generated by a braking system of the vehicle to at least one of a battery and electric motor assemblies, thereby reducing the waste of energy during the braking process of the vehicle, and facilitating the alleviation of the thermal degradation of the braking system of the vehicle. Another object of the present disclosure is to provide a working method of the above-mentioned thermal management system for a vehicle.

To achieve the above-mentioned object, the present disclosure may adopt the following technical solutions.

The present disclosure provides a thermal management system for a vehicle as follows, comprising a main path, a first branch and a second branch, wherein a braking system and a first power source, which are connected in series to each other, are provided in the main path, a battery is provided in the first branch, electric motor assemblies are provided in the second branch, and the main path can be selectively in fluid communication with at least one of the first branch and the second branch, such that a fluid medium from the main path can be driven by the first power source to flow through at least one of the first branch and the second branch and then return to the main path.

In one optional solution, a first radiator and a second power source, which are connected in series to the electric motor assemblies, are also provided in the second branch, the thermal management system for a vehicle further comprises a third branch, and a second radiator is provided in the third branch.

In another optional solution, the first branch comprises a first bypass connected in parallel to the battery, the second branch comprises a second bypass connected in parallel to the first radiator, and the third branch comprises a third bypass connected in parallel to the second radiator.

In another optional solution, a first three-way valve is also provided in the first branch, and a fluid medium in the first branch can flow through the battery or the first bypass by controlling the first three-way valve;

a second three-way valve is also provided in the second branch, and a fluid medium in the second branch can flow through the first radiator or the second bypass by controlling the second three-way valve; and a third three-way valve is also provided in the third branch, and a fluid medium in the third branch can flow through the second radiator or the third bypass by controlling the third three-way valve.

In another optional solution, the thermal management system for a vehicle further comprises a first four-way valve and a second four-way valve, a first inlet of the first four-way valve is in fluid communication with the main path, and a first outlet of the first four-way valve is in fluid communication with the first branch; a second inlet of the first four-way valve is in fluid communication with the second branch, and a second outlet of the first four-way valve is in fluid communication with the third branch; in the first four-way valve, one of the first inlet and the second inlet is in fluid communication with one of the first outlet and the second outlet, and meanwhile, the other one of the first inlet and the second inlet is in fluid communication with the other one of the first outlet and the second outlet;

a first inlet of the second four-way valve is in fluid communication with the first branch, and a first outlet of the second four-way valve is in fluid communication with the main path; a second inlet of the second four-way valve is in fluid communication with the third branch, and a second outlet of the second four-way valve is in fluid communication with the second branch; and in the second four-way valve, one of the first inlet and the second inlet is in fluid communication with one of the first outlet and the second outlet, and meanwhile, the other one of the first inlet and the second inlet is in fluid communication with the other one of the first outlet and the second outlet.

In another optional solution, the thermal management system for a vehicle further comprises a fan, and the first radiator and the second radiator are arranged side by side, such that air flow from the fan can flow through the first radiator and the second radiator.

In another optional solution, the fluid medium is a mixed solution of water and ethylene glycol.

The present disclosure further provides a working method of the thermal management system for a vehicle according to any one of the above-mentioned technical solutions, comprising the following three working modes:

in a first working mode, the fluid medium from an inside of the main path flows through the battery in the first branch and then returns to the main path;

in a second working mode, the fluid medium from the inside of the main path flows through the electric motor assemblies in the second branch and then returns to the main path; and in a third working mode, the fluid medium from the inside of the main path flows through the battery in the first branch and the electric motor assemblies in the second branch and then returns to the main path.

The present disclosure further provides a working method of the above-mentioned thermal management system for a vehicle, comprising the following three working modes:

in a first working mode, the fluid medium from an inside of the main path flows through the battery in the first branch and then returns to the main path; in the first four-way valve, the first inlet is in fluid communication with the first outlet, and the second inlet is in fluid communication with the second outlet; in the second four-way valve, the first inlet is in fluid communication with the first outlet, and the second inlet is in fluid communication with the second outlet; the first three-way valve is controlled to enable the fluid medium in the first branch to flow through the battery; and in a second working mode, the fluid medium from the inside of the main path flows through the electric motor assemblies in the second branch and then returns to the main path; in the first four-way valve, the first inlet is in fluid communication with the second outlet, and the second inlet is in fluid communication with the first outlet; in the second four-way valve, the first inlet is in fluid communication with the first outlet, and the second inlet is in fluid communication with the second outlet; the first three-way valve is controlled to enable the fluid medium in the first branch to flow through the first bypass; the second three-way valve is controlled to enable the fluid medium in the second branch to flow through the second bypass; the third three-way valve is controlled to enable the fluid medium in the third branch to flow through the third bypass;

in a third working mode, the fluid medium from the inside of the main path flows through the battery in the first branch and the electric motor assemblies in the second branch and then returns to the main path; in the first four-way valve, the first inlet is in fluid communication with the first outlet, and the second inlet is in fluid communication with the second outlet; in the second four-way valve, the first inlet is in fluid communication with the second outlet, and the second inlet is in fluid communication with the first outlet; the first three-way valve is controlled to enable the fluid medium in the first branch to flow through the battery; the second three-way valve is controlled to enable the fluid medium in the second branch to flow through the second bypass; and the third three-way valve is controlled to enable the fluid medium in the third branch to flow through the third bypass.

In one optional solution, the working method further comprises a fourth working mode, wherein in the first four-way valve, the first inlet is in fluid communication with the second outlet, and the second inlet is in fluid communication with the first outlet; in the second four-way valve, the first inlet is in fluid communication with the second outlet, and the second inlet is in fluid communication with the first outlet; the first three-way valve is controlled to enable the fluid medium in the first branch to flow through the first bypass; the second three-way valve is controlled to enable the fluid medium in the second branch to flow through the first radiator; and the third three-way valve is controlled to enable the fluid medium in the third branch to flow through the second radiator.

By adopting the above technical solutions, the present disclosure provides a novel thermal management system for a vehicle, and a working method thereof. The thermal management system for a vehicle comprises a main path, a first branch and a second branch. A braking system and a first power source, which are connected in series to each other, are provided in the main path, a battery is provided in the first branch, and electric motor assemblies are provided in the second branch. The main path can be selectively in fluid communication with at least one of the first branch and the second branch, such that a fluid medium from the main path can be driven by the first power source to flow through at least one of the first branch and the second branch and then return to the main path. In this way, through the thermal management system for a vehicle according to the present disclosure, the heat generated by the braking system of the vehicle can be transferred to the battery and/or the electric motor assemblies for use, thereby being able to fully utilize the heat generated by the braking system of the vehicle, reducing the waste of energy during the braking process of the vehicle, and facilitating the alleviation of the thermal degradation of the braking system.

DETAILED DESCRIPTION

Exemplary embodiments of the present disclosure are described below with reference to the attached drawings. It should be understood that these specific descriptions are only used to teach those skilled in the art how to implement the present disclosure, and are neither intended to be exhaustive of all possible ways of the present disclosure nor to limit the scope of the present disclosure.

The structure of a thermal management system for a vehicle according to an embodiment of the present disclosure will be described below with reference to attached drawings.

(Structure of the Thermal Management System for a Vehicle According to an Embodiment of the Present Disclosure)

Figure 1:
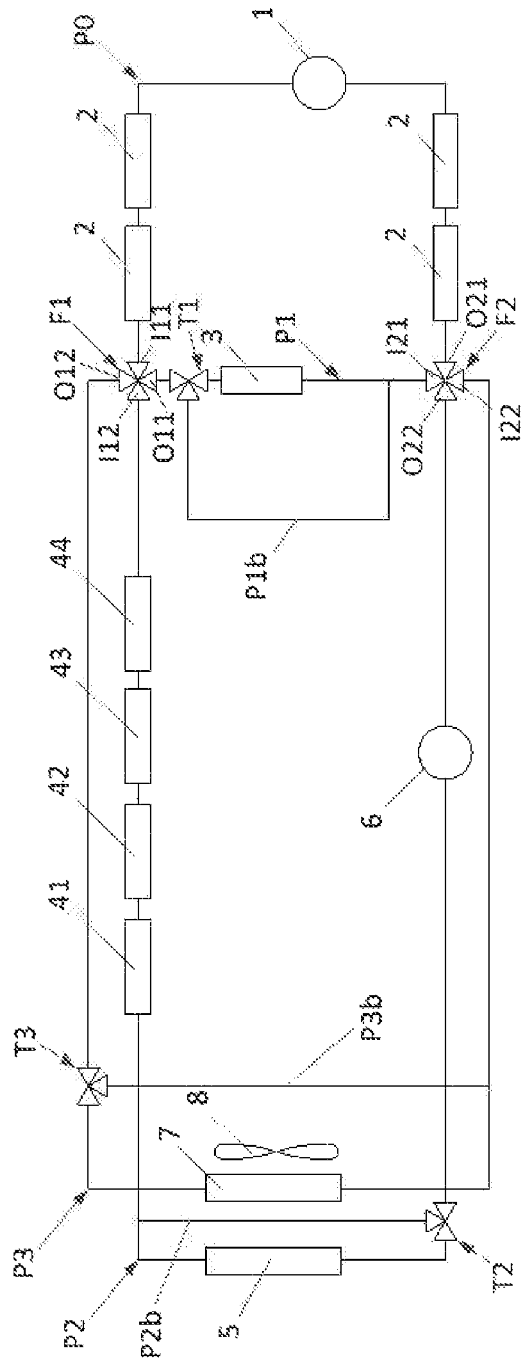
FIG. 1 is a schematic diagram of a connecting structure of a thermal management system for a vehicle according to an embodiment of the present disclosure.

As shown in FIG. 1, the thermal management system for a vehicle according to an embodiment of the present disclosure comprises a main path P0, a first branch P1, a second branch P2 and a third branch P3. A fluid medium flows in a flow path composed of the main path P0, the first branch P1, the second branch P2 and the third branch P3. In the present embodiment, the fluid medium may be a mixed solution of water and ethylene glycol, and mass percentage concentrations of both water and ethylene glycol are, for example, 50%.

In the present embodiment, a first power source 1 and four braking systems 2, which are connected in series to each other, are provided in the main path P0. The first power source 1 is, for example, an electric pump, which is able to pump the fluid medium in the main path P0. The four braking systems 2 are respectively used for braking four wheels of the vehicle. Each braking system 2 comprises a fluid pipeline (not shown) for cooling the corresponding braking system 2, and the main path P0 actually connects the fluid pipelines of the four braking systems 2 in series.

In the present embodiment, a battery 3 is provided in the first branch P1. An example of the battery 3 is a battery pack or a battery stack, the battery 3 comprises a fluid pipeline (not shown), and the first branch P1 is in fluid communication with the fluid pipeline of the battery 3. Further, as shown in FIG. 1, the first branch P1 further comprises a first three-way valve T1 and a first bypass P1*b* connected in parallel to the battery 3, and the fluid medium in the first branch P1 can selectively flow through the battery 3 or the first bypass P1*b* by controlling the first three-way valve T1.

In the present embodiment, electric motor assemblies, a first radiator 5 and a second power source 6, which are connected in series to each other, are provided in the second branch P2. Specifically, the electric motor assemblies may comprise an electric motor 41, an electric motor control unit 42, a transformer 43 and an onboard charging unit 44, and the second branch P2 actually connects respective fluid pipelines (not shown) of the electric motor 41, the electric motor control unit 42, the transformer 43 and the onboard charging unit 44 in series. The first radiator 5 may be any type of radiator, for example, the first radiator may comprise a large number of radiating fins disposed side by side. The second power source 6 is, for example, an electric pump, which is able to pump the fluid medium in the second branch P2. Further, as shown in FIG. 1, the second branch P2 comprises a second three-way valve T2 and a second bypass P2*b* connected in parallel to the first radiator 5, and the fluid medium in the second branch P2 can selectively flow through the first radiator 5 or the second bypass P2*b* by controlling the second three-way valve T2.

In the present embodiment, a second radiator 7 is provided in the third branch P3. Further, as shown in FIG. 1, the third branch P3 further comprises a third three-way valve T3 and a third bypass P3*b* connected in parallel to the second radiator 7, and the fluid medium in the third branch P3 can selectively flow through the second radiator 7 or the third bypass P3*b* by controlling the third three-way valve T3.

In order to enable the fluid medium that carries heat away from the braking systems 2 in the main path P0 to selectively flow through at least one of the battery 3, the electric motor assemblies and the second radiator 7, in the present embodiment, the main path P0 can be selectively in fluid communication with at least one of the first branch P1, the second branch P2 and the third branch P3. Therefore, the thermal management system for a vehicle further comprises a first four-way valve F1 and a second four-way valve F2.

Specifically, the first four-way valve F1 comprises a first inlet I11, a second inlet I12, a first outlet O11 and a second outlet O12. In the first four-way valve F1, one of the first inlet I11 and the second inlet I12 is in fluid communication with one of the first outlet O11 and the second outlet O12, and meanwhile, the other one of the first inlet I11 and the second inlet I12 is in fluid communication with the other one of the first outlet O11 and the second outlet O12. Further, as shown in FIG. 1, the first inlet I11 of the first four-way valve F1 is in fluid communication with the main path P0, the first outlet O11 of the first four-way valve F1 is in fluid communication with the first branch P1, the second inlet I12 of the first four-way valve F1 is in fluid communication with the second branch P2, and the second outlet O12 of the first four-way valve F1 is in fluid communication with the third branch P3.

Further, the second four-way valve F2 comprises a first inlet I21, a second inlet I22, a first outlet O21 and a second outlet O22. In the second four-way valve F2, one of the first inlet I21 and the second inlet I22 is in fluid communication with one of the first outlet O21 and the second outlet O22, and meanwhile, the other one of the first inlet I21 and the second inlet I22 is in fluid communication with the other one of the first outlet O21 and the second outlet O22. Further, as shown in FIG. 1, the first inlet I21 of the second four-way valve F2 is in fluid communication with the first branch P1, the first outlet O21 of the second four-way valve F2 is in fluid communication with the main path P0, the second inlet I22 of the second four-way valve F2 is in fluid communication with the third branch P3, and the second outlet O22 of the second four-way valve F2 is in fluid communication with the second branch P2.

In addition, in the present embodiment, the thermal management system for a vehicle further comprises a fan 8, and the first radiator 5 and the second radiator 7 are arranged side by side, such that air flow from the fan 8 can flow through the first radiator 5 and the second radiator 7, thereby being able to increase the radiating efficiency of the first radiator 5 and the second radiator 7.

A working method of the thermal management system for a vehicle according to an embodiment of the present disclosure is described below.

In the thermal management system for a vehicle according to an embodiment of the present disclosure as shown in FIG. 1, four following working modes can be implemented.

When the vehicle is located in a low temperature environment, the temperature of the battery 3 is lower than a predetermined value, and the temperature of the electric motor assemblies is lower than the temperature of the battery 3. At this time, it is necessary to preferentially increase the temperature of the battery 3. In order to avoid the influence of the electric motor assemblies on the heating efficiency of the battery 3, a first working mode can be adopted. In the first working mode, the fluid medium from an inside of the main path P0 flows through the battery 3 in the first branch P1 and then returns to the main path P0.

Figure 2A:
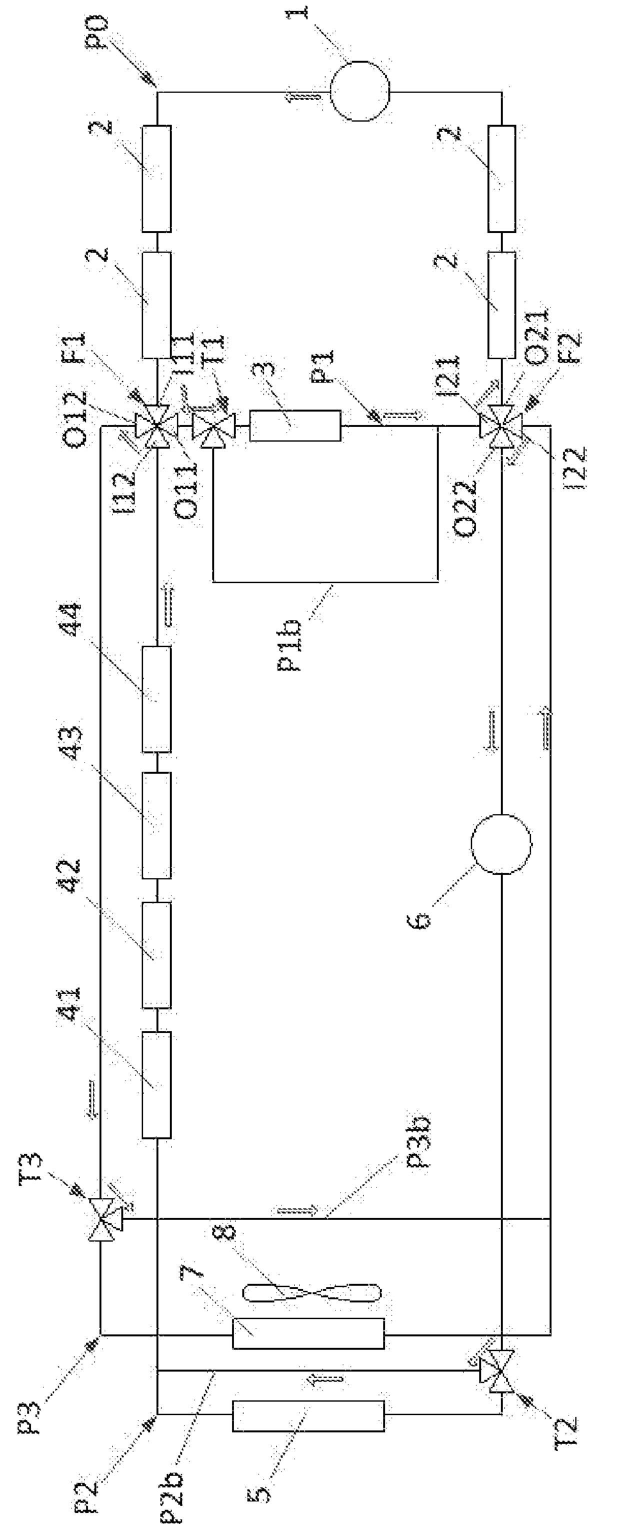
FIG. 2A is a schematic diagram for illustrating a first working mode of the thermal management system for a vehicle in FIG. 1, wherein hollow arrows indicate flowing directions of a fluid medium.

Specifically, as shown in FIG. 2A, in the first working mode, in the first four-way valve F1, the first inlet I11 is in fluid communication with the first outlet O11, and the second inlet I12 is in fluid communication with the second outlet O12; and in the second four-way valve F2, the first inlet I21 is in fluid communication with the first outlet O21, and the second inlet I22 is in fluid communication with the second outlet O22. Further, the first three-way valve T1 is controlled to enable the fluid medium in the first branch P1 to flow through the battery 3, the second three-way valve T2 is controlled to enable the fluid medium in the second branch P2 to flow through the second bypass P2*b*, and the third three-way valve T3 is controlled to enable the fluid medium in the third branch P3 to flow through the third bypass P3*b*.

In this way, as shown in FIG. 2A, in the first working mode, the fluid medium from the main path P0 is driven by the first power source 1 to flow through the four braking systems 2 and then circularly flow via the following flow path: the first inlet I11 of the first four-way valve F1→the first outlet O11 of the first four-way valve F1→the battery 3→the first inlet I21 of the second four-way valve F2→the first outlet O21 of the second four-way valve F2; and the fluid medium from the second branch P2 is driven by the second power source 6 to circularly flow via the following flow path: the second three-way valve T2→the second bypass P2*b*→the electric motor assemblies→the second inlet I12 of the first four-way valve F1→the second outlet O12 of the first four-way valve F1→the third three-way valve T3→the third bypass P3*b*→the second inlet I22 of the second four-way valve F2→the second outlet O22 of the second four-way valve F2. Therefore, in the first working mode, the fluid medium from the main path P0 only heats the battery 3. In addition, it can be understood that in the first working mode, the startup of the second power source 6 is optional, that is to say, the circular flow of the fluid medium driven by the second power source 6 is optional.

When the vehicle is located in a low temperature environment, but the temperature of the battery 3 is higher than the predetermined value, considering that the electric motor assemblies have a better working state at about 70° C.-80° C., it is necessary to preferentially increase the temperature of the electric motor assemblies at this time. In order to avoid the influence of the battery 3 on the heating efficiency of the electric motor assemblies, a second working mode can be adopted. In the second working mode, the fluid medium from the inside of the main path P0 flows through the electric motor assemblies in the second branch P2 and then returns to the main path P0.

Figure 2B:
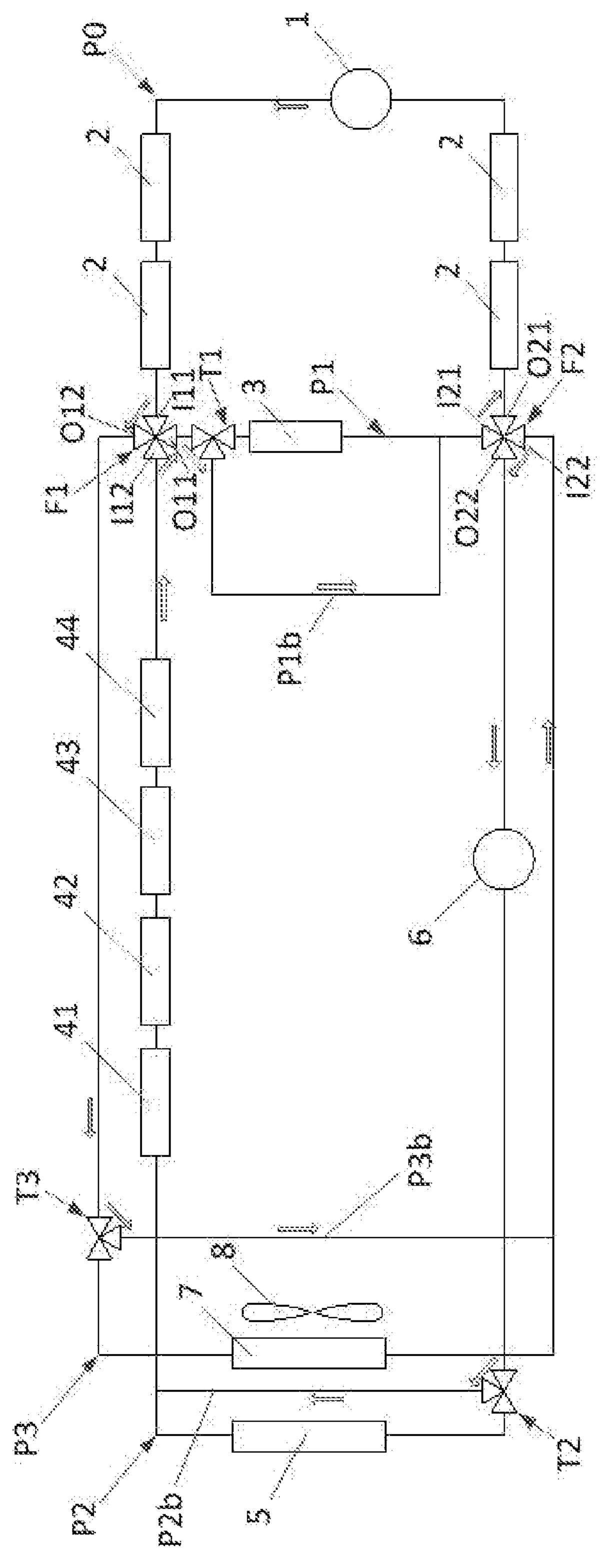
FIG. 2B is a schematic diagram for illustrating a second working mode of the thermal management system for a vehicle in FIG. 1, wherein hollow arrows indicate flowing directions of the fluid medium.

Specifically, as shown in FIG. 2B, in the second working mode, in the first four-way valve F1, the first inlet I11 is in fluid communication with the second outlet O12, and the second inlet I12 is in fluid communication with the first outlet O11; and in the second four-way valve F2, the first inlet I21 is in fluid communication with the first outlet O21, and the second inlet I22 is in fluid communication with the second outlet O22. Further, the first three-way valve T1 is controlled to enable the fluid medium in the first branch P1 to flow through the first bypass P1*b*, the second three-way valve T2 is controlled to enable the fluid medium in the second branch P2 to flow through the second bypass P2*b*, and the third three-way valve T3 is controlled to enable the fluid medium in the third branch P3 to flow through the third bypass P3*b*.

In this way, as shown in FIG. 2B, in the second working mode, the fluid medium from the main path P0 is driven by the first power source 1 to flow through the four braking systems 2 and then circularly flow via the following flow path: the first inlet I11 of the first four-way valve F1→the second outlet O12 of the first four-way valve F1→the third three-way valve T3→the third bypass P3*b*→the second inlet I22 of the second four-way valve F2→the second outlet O22 of the second four-way valve F2→the second power source 6→the second three-way valve T2→the second bypass P2*b*→the electric motor assemblies→the second inlet I12 of the first four-way valve F1→the first outlet O11 of the first four-way valve F1→the first three-way valve T1→the first bypass P1*b*→the first inlet I21 of the second four-way valve F2→the first outlet O21 of the second four-way valve F2. Therefore, in the second working mode, the fluid medium from the main path P0 only heats the electric motor assemblies. In addition, it can be understood that in the second working mode, the startup of the second power source 6 is optional, that is to say, the second power source 6 can assist the first power source 1 in driving the fluid medium.

When the vehicle is located in a low temperature environment, the temperature of the battery 3 is lower than the predetermined value, and the temperature of the electric motor assemblies is higher than the temperature of the battery 3. At this time, in order to increase the heating efficiency of the battery 3, a third working mode can be adopted. In the third working mode, the fluid medium from the inside of the main path P0 flows through the battery 3 in the first branch P1 and the electric motor assemblies in the second branch P2 and then returns to the main path P0.

Figure 2C:
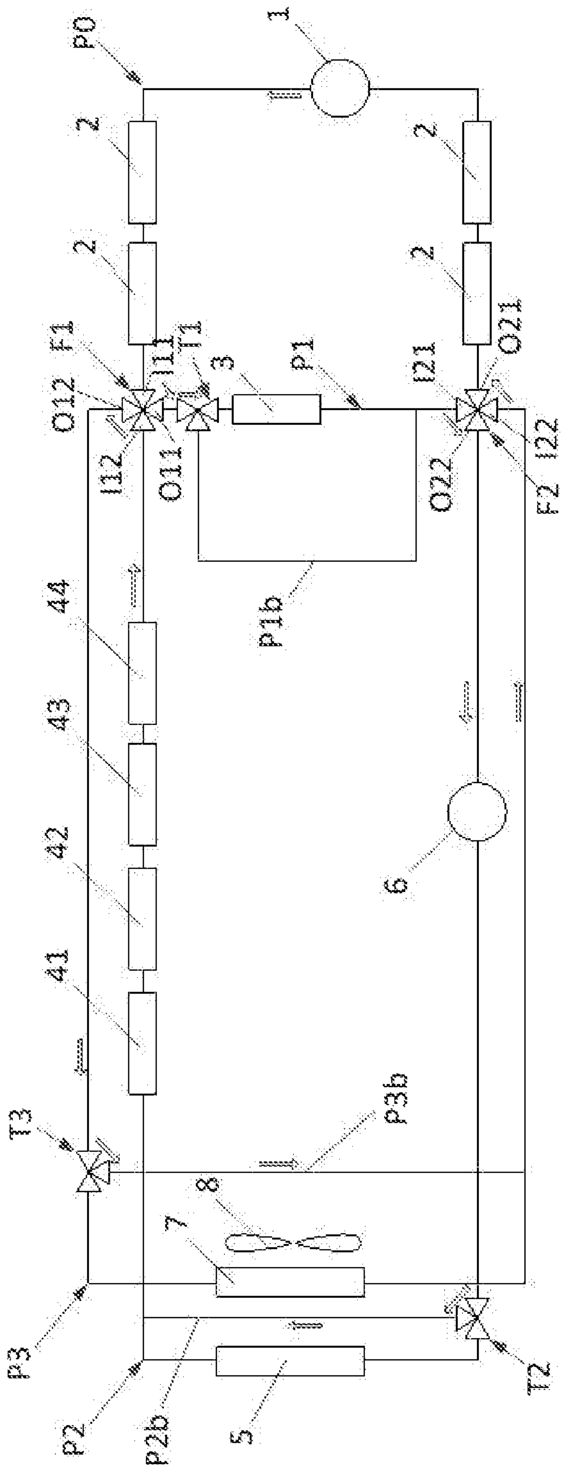
FIG. 2C is a schematic diagram for illustrating a third working mode of the thermal management system for a vehicle in FIG. 1, wherein hollow arrows indicate flowing directions of the fluid medium.

Specifically, as shown in FIG. 2C, in the third working mode, in the first four-way valve F1, the first inlet I11 is in fluid communication with the first outlet O11, and the second inlet I12 is in fluid communication with the second outlet O12; and in the second four-way valve F2, the first inlet I21 is in fluid communication with the second outlet O22, and the second inlet I22 is in fluid communication with the first outlet O21. Further, the first three-way valve T1 is controlled to enable the fluid medium in the first branch P1 to flow through the battery 3, the second three-way valve T2 is controlled to enable the fluid medium in the second branch P2 to flow through the second bypass P2*b*, and the third three-way valve T3 is controlled to enable the fluid medium in the third branch P3 to flow through the third bypass P3*b*.

In this way, as shown in FIG. 2C, in the third working mode, the fluid medium from the main path P0 is driven by the first power source 1 to flow through the four braking systems 2 and then circularly flow via the following flow path: the first inlet I11 of the first four-way valve F1→the first outlet O11 of the first four-way valve F1→the first three-way valve T1→the battery 3→the first inlet I21 of the second four-way valve F2→the second outlet O22 of the second four-way valve F2→the second power source 6→the second three-way valve T2→the second bypass P2*b*→the electric motor assemblies→the second inlet I12 of the first four-way valve F1→the second outlet O12 of the first four-way valve F1→the third three-way valve T3→the third bypass P3*b*→the second inlet I22 of the second four-way valve F2→the first outlet O21 of the second four-way valve F2. It can be understood that in the third working mode, the startup of the second power source 6 is optional, that is to say, the second power source 6 can assist the first power source 1 in driving the fluid medium.

When the vehicle is located in a high temperature environment, the temperature of the battery 3 is higher than the predetermined value, but when the vehicle is unable to recover braking energy due to reasons such as a relatively high state of charge of the battery 3 or a vehicle speed limit, the heat from the braking systems 2 of the vehicle can only be dissipated into air, so the thermal management system for a vehicle according to an embodiment of the present disclosure may be in a fourth working mode as follows.

Figure 2D:
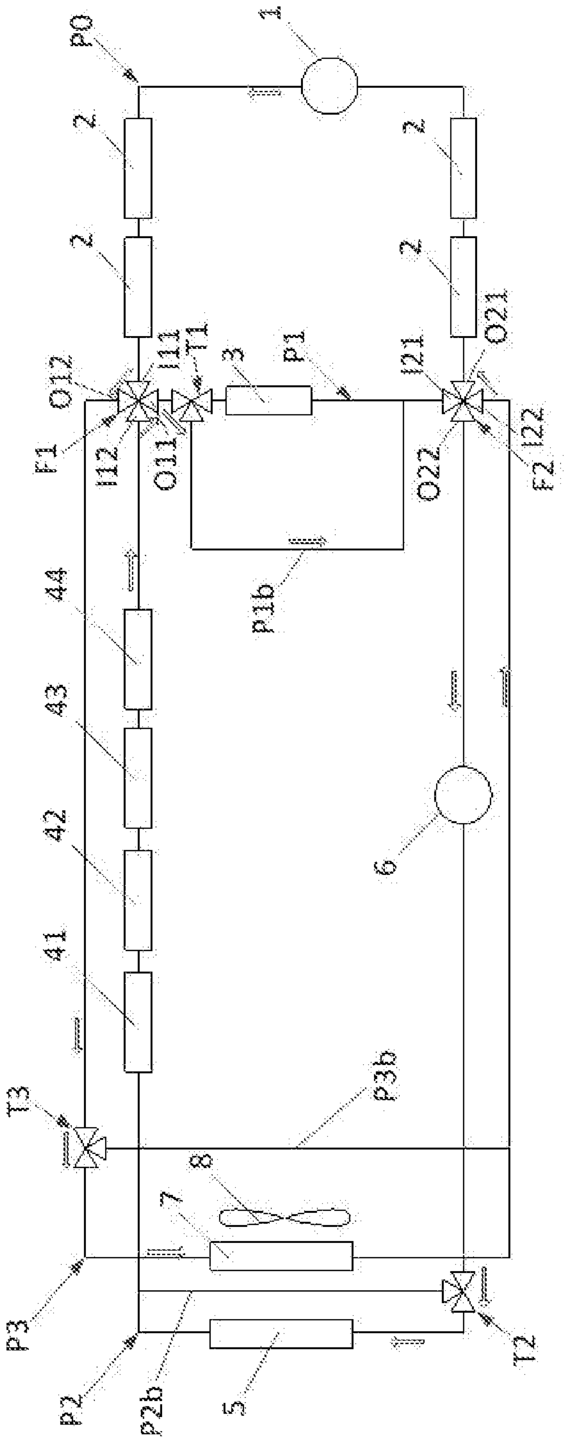
FIG. 2D is a schematic diagram for illustrating a fourth working mode of the thermal management system for a vehicle in FIG. 1, wherein hollow arrows indicate flowing directions of the fluid medium.

Specifically, as shown in FIG. 2D, in the fourth working mode, in the first four-way valve F1, the first inlet I11 is in fluid communication with the second outlet O12, and the second inlet I12 is in fluid communication with the first outlet O11; and in the second four-way valve F2, the first inlet I21 is in fluid communication with the second outlet O22, and the second inlet I22 is in fluid communication with the first outlet O21. Further, the first three-way valve T1 enables the fluid medium in the first branch P1 to flow through the first bypass P1*b*, the second three-way valve T2 enables the fluid medium in the second branch P2 to flow through the first radiator 5, and the third three-way valve T3 enables the fluid medium in the third branch P3 to flow through the second radiator 7.

In this way, as shown in FIG. 2D, in the fourth working mode, the fluid medium from the main path P0 is driven by the first power source 1 to flow through the four braking systems 2 and then circularly flow via the following flow path: the first inlet I11 of the first four-way valve F1→the second outlet O12 of the first four-way valve F1→the third three-way valve T3→the second radiator 7→the second inlet I22 of the second four-way valve F2→the first outlet O21 of the second four-way valve F2. The fluid medium from the second branch P2 is driven by the second power source 6 to circularly flow via the following flow path: the second three-way valve T2→the first radiator 5→the electric motor assemblies→the second inlet I12 of the first four-way valve F1→the first outlet O11 of the first four-way valve F1→the first bypass P1*b*→the first inlet I21 of the second four-way valve F2→the second outlet O22 of the second four-way valve F2. Therefore, in the fourth working mode, the fluid medium from the main path P0 dissipates heat at the second radiator 7, and the fluid medium flowing through the electric motor assemblies dissipates heat at the first radiator 5.

Certainly, the present disclosure is not limited to the above-mentioned embodiments, and those skilled in the art can make various modifications to the above-mentioned embodiments of the present disclosure under the teaching of the present disclosure without departing from the scope of the present disclosure. For this reason, the following explanation is also made.

i. It can be understood that in the vehicle with the thermal management system for a vehicle according to the present disclosure, a braking energy recovery function can still be adopted. In this way, the kinetic energy of the vehicle can be converted into the electric energy of the battery or the thermal energy in the thermal management system according to actual situations. In addition, the thermal management system for a vehicle according to the present disclosure is particularly suitable for a vehicle under a low temperature condition, and the deceleration ability of the vehicle under the low temperature condition is improved; and the battery is protected, and the battery performance is improved.

ii. The fluid medium involved in the present disclosure is not limited to the situations described above, and the mass percentage concentrations of water and ethylene glycol in the fluid medium are also not limited to numerical values described in the above-mentioned specific embodiments, but may be appropriately selected according to needs. The fluid medium is formed by water and ethylene glycol, such that the fluid medium can still be maintained in a liquid state at a relatively low temperature.

iii. The working modes of the thermal management system for a vehicle according to the present disclosure may be not limited to the four working modes listed in the above-mentioned specific embodiments, and other working modes may be added according to needs and are mainly implemented by converting the working states of the three-way valves and the four-way valves. It can be understood that the three-way valves and the four-way valves in the thermal management system for a vehicle according to the present disclosure may be replaced by other control valves, and the same effect can also be achieved.

iv. The number of the braking systems in the vehicle comprising the thermal management system according to the present disclosure and the number of the braking systems in the thermal management system for a vehicle according to the present disclosure are not limited to the situations described above. For example, at least one braking system can be connected into the main path P0.

v. The thermal management system for a vehicle according to the present disclosure may further comprise a fluid medium container, and the fluid medium container may be provided in the main path to be used for storing the fluid medium.

vi. The thermal management system for a vehicle according to the present disclosure is not only suitable for pure electric vehicles, but also can be applied to hybrid power vehicles.

LIST OF REFERENCE NUMERALS

1 First power source
2 Braking system
3 Battery
41 Electric motor
42 Electric motor control unit
43 Transformer
44 Onboard charging unit
5 First radiator
6 Second power source
7 Second radiator
8 Fan
P0 Main path
P1 First branch
P1*b* First bypass
P2 Second branch
P2*b* Second bypass
P3 Third branch
P3*b* Third bypass
F1 First four-way valve
I11 First inlet of first four-way valve
I12 Second inlet of first four-way valve
O11 First outlet of first four-way valve
O12 Second outlet of first four-way valve
F2 Second four-way valve
I21 First inlet of second four-way valve
I22 Second inlet of second four-way valve
O21 First outlet of second four-way valve
O22 Second outlet of second four-way valve
T1 First three-way valve
T2 Second three-way valve
T3 Third three-way valve.

The invention claimed is:

1. A thermal management system for a vehicle, comprising:

a main path comprising a braking system fluidly connected in series with a first power source, a first branch, further comprising:

a battery, a first bypass connected in parallel to the battery, a second branch comprising:

electric motor assemblies;

a first radiator and a second power source fluidly connected in series to the electric motor assemblies, a second bypass fluidly connected in parallel to the first radiator, a third branch comprising:

a second radiator, and a third bypass connected in parallel to the second radiator, wherein the main path is configured to be in selective fluid communication with at least one of the first branch and the second branch, such that a fluid medium from the main path is configured to be driven by the first power source to flow through at least one of the first branch and the second branch and then return to the main path.

2. The thermal management system according to claim 1, wherein:

the first branch further comprises a first three-way valve, and a fluid medium in the first branch is configured to flow through the battery or the first bypass via controlling the first three-way valve;

the second branch further comprises a second three-way valve, and a fluid medium in the second branch is configured to flow through the first radiator or the second bypass via controlling the second three-way valve; and the third branch further comprises a third three-way valve, and a fluid medium in the third branch is configured to flow through the second radiator or the third bypass via controlling the third three-way valve.

3. The thermal management system according to claim 1, wherein the fluid medium is a mixed solution of water and ethylene glycol.

4. A working method of the thermal management system according to claim 1, comprising:

flowing the fluid medium, in a first working mode, from the main path and through the battery in the first branch and then returning the fluid medium to the main path;

flowing the fluid medium, in a second working mode, from the main path and through the electric motor assemblies in the second branch and then returning the fluid medium to the main path; and flowing the fluid medium, in a third working mode, from the main path and through: i) the battery in the first branch, and ii) the electric motor assemblies in the second branch, and then returning the fluid medium to the main path.

5. The thermal management system of claim 1, wherein the electric motor assemblies comprise an electric motor, and an electric motor control unit.

6. The thermal management system of claim 5, wherein the electric motor assemblies further comprise a transformer and an onboard charging unit.

7. The thermal management system of claim 1, wherein the first power source is an electric pump.

8. A thermal management system for a vehicle, comprising:

a main path comprising a braking system fluidly connected in series with a first power source, a first branch comprising:

a battery, a first bypass connected in parallel to the battery, a second branch comprising:

electric motor assemblies, a first radiator and a second power source fluidly connected in series to the electric motor assemblies, a second bypass fluidly connected in parallel to the first radiator, a third branch comprising:

a second radiator, a third bypass connected in parallel to the second radiator, and a fan, and the first radiator and the second radiator are arranged side by side, such that air flow from the fan is configured to flow through the first radiator and the second radiator;

wherein the main path is configured to be in selective fluid communication with at least one of the first branch and the second branch, such that a fluid medium from the main path is configured to be driven by the first power source to flow through at least one of the first branch and the second branch and then return to the main path.

9. A thermal management system for a vehicle, comprising:

a main path comprising a braking system fluidly connected in series with a first power source, a first branch comprising:

a battery, a first bypass connected in parallel to the battery, a second branch comprising:

electric motor assemblies, a first radiator and an electric pump fluidly connected in series to the electric motor assemblies, a second bypass fluidly connected in parallel to the first radiator, a third branch comprising:

a second radiator, and a third bypass connected in parallel to the second radiator, wherein the main path is configured to be in selective fluid communication with at least one of the first branch and the second branch, such that a fluid medium from the main path is configured to be driven by the first power source to flow through at least one of the first branch and the second branch and then return to the main path.

10. A thermal management system for a vehicle, comprising:

a main path comprising a braking system fluidly connected in series with a first electric pump, a first branch comprising a battery, a second branch comprising:

electric motor assemblies, and a first radiator and a second electric pump fluidly connected in series with the electric motor assemblies, and the main path is configured to be in selective fluid communication with each of the first branch and the second branch via controlling of a first valve, such that a fluid medium from the main path is configured to be driven by the first electric pump to flow: i) in a first working mode, through the first branch and then return to the main path, and ii) in a second working mode, through the second branch without flowing through the first branch, and then return to the main path.

11. The thermal management system according to claim 10, wherein the second branch further comprises a second electric pump.

12. The thermal management system according to claim 11, wherein in the second working mode, use of the second electric pump is not required to drive the fluid medium through the second branch.

13. The thermal management system according to claim 10, further comprising a third branch comprising a second radiator, and the third branch is fluidly connected to each of the main path, the first branch, and the second branch.

14. The thermal management system according to claim 13, further comprising a fan, and the first radiator and the second radiator are arranged side by side, such that air flow from the fan is configured to flow through the first radiator and the second radiator.

15. The thermal management system according to claim 13, wherein in the first working mode and the second working mode, the fluid medium does not flow through the second radiator.

16. The thermal management system according to claim 15, wherein in a third working mode, the fluid medium flows through the braking system and the second radiator without flowing through the battery.

17. The thermal management system according to claim 13, wherein in the first working mode and in the second working mode, the fluid medium bypasses the second radiator via a three-way valve.

18. A thermal management system for a vehicle, comprising:

a main path comprising a braking system fluidly connected in series with a first power source, a first branch comprising, in a direction of fluid flow, a first four-way valve, a first three-way valve, a battery, and a second four-way valve fluidly connected in series with each other, a second branch comprising, in a direction of fluid flow, the second four-way valve, a second power source, a second three-way valve, a first radiator, electric motor assemblies, and the first four-way valve fluidly connected in series with each other, a third branch comprising, in a direction of fluid flow, the first four-way valve, a third three-way valve, a second radiator, and the second four-way valve fluidly connected in series with each other, the main path is configured to be in selective fluid communication with each of the first branch and the second branch via controlling of the first four-way valve, such that a fluid medium from the main path is configured to be driven by the first power source to flow: i) in a first working mode, through the first branch and then return to the main path, and ii) in a second working mode, through the second branch without flowing through the first branch, and then return to the main path.

* * * * *